United States Patent Office 3,300,506
Patented Jan. 24, 1967

---

3,300,506
1-INDOLYL SUBSTITUTED-2-PYRIDYL-ETHANES
Chester John Cavallito and Allan Poe Gray, Decatur, Ill., assignors to Neisler Laboratories, Inc., Decatur, Ill., a corporation of Delaware
No Drawing. Filed Oct. 16, 1959, Ser. No. 846,810
5 Claims. (Cl. 260—296)

This invention relates to compositions of matter known in the art of chemistry as substituted indenes and azaindenes, and to the acid addition salts thereof. This application is a continuation-in-part of application S. N. 593,058, filed June 22, 1956.

The invention is described as residing in the concept of a chemical compound having a molecular structure in which there is attached, to the 1-, 2-, or 3-position of an indene or azaindene nucleus, a pyridylethyl moiety, the pyridine and indene or azaindene nuclei being attached to different carbon atoms of the ethylene bridge.

As herein used, the term "azaindene" means a nitrogen-containing analog of indene selected from the group consisting of indole, benzodiazole, and benzortiazole nuclei.

As herein used, the term "simple substituted" as applied to indene or an azaindene indicates that the available positions on the 5-membered ring can be substituted with simple substituents, such as hydrogen and lower alkyl, for example, methyl, ethyl, propyl, and isopropyl; aralkyl, for example, benzyl and phenethyl; aryl, for example, phenyl; and that the simple substituents on the benzenoid ring can be lower alkyl, for example, methyl, ethyl, propyl and isopropyl; lower alkoxy, for example, methoxy, ethoxy, and propoxy; lower alkylthio, for example, thiomethyl, thioethyl and thiopropyl; trifluoromethyl; nitro; halo; amino and hydroxy.

As herein used, the term "simple substituted" as applied to a pyridylethyl moiety indicates simple substituents, such as lower alkyl, for example, methyl, ethyl, and propyl; and trifluoromethyl.

As above stated, the invention is the concept of the composition formed by the union of the fused ring nuclei with the pyridylethyl moiety, and the compositions formed by employing simple substituted starting materials embodying said nuclei and moiety are the full equivalents of the subject matter hereinafter particularly pointed out and distinctly claimed and are regarded by the applicants as their invention.

The physical embodiments of the invention are high boiling oils or crystalline solids of moderate melting points, soluble in the usual organic solvents, for example, ethyl alcohol, isopropyl alcohol, benzene, and chloroform, and readily form water soluble acid addition salts. Data obtained by elemental analysis, ultraviolet and infrared spectra, and their mode of synthesis, confirm the structures of the compounds.

The physical embodiments of the present invention all possess the inherent applied use characteristics of suppressing stress and agitated states in the animal organism as demonstrated by pharmacological tests in mice and dogs. Certain of the physical embodiments possess the specific applied use characteristic of potentiating barbiturate anesthesia, for example, 4-(3-indolylethyl)-pyridine (Example 1), 4-(1-methyl-3-indolylethyl)-pyridine (Example 3), 2-(1-methyl-3-indolylethyl)-pyridine (Example 5), 4-(1-benzyl-3-indolylethyl)-pyridine (Example 7), 4-(1-indolylethyl)-pyridine (Example 9), 2-(1-benzotriazolylethyl)-pyridine (Example 10), 4-(indenylethyl)-pyridine (Example 11), 2-(indenylethyl)-pyridine (Example 12), 4-(2-methyl-3-indolylethyl)-pyridine (Example 13), 4-(3-methyl-1-indolylethyl)-pyridine (Example 14), 4-(1-ethyl-3-indolylethyl)-pyridine (Example 15), 4-(1-benzimidazolylethyl)-pyridine (Example 16), 4-(2-benzotriazolylethyl)-pyridine (Example 21) and 4-(1-benzotriazolylethyl)-pyridine (Example 22); antagonizing excited states, for example, 4-(3-indolylethyl)-pyridine (Example 1), 2-(3-indolylethyl)-pyridine (Example 2), 4-(1-methyl-3-indolylethyl)-pyridine (Example 3), 4-(1-benzyl-3-indolylethyl)-pyridine (Example 7), 2-(1-benzotriazolylethyl)-pyridine (Example 10), 4-(indenylethyl)-pyridine (Example 11), 2-(indenylethyl)-pyridine (Example 12), 4-(3-methyl-1-indolylethyl)-pyridine (Example 14), 4-(1-ethyl-3-indolylethyl)-pyridine (Example 15), 2-(1-benzimidazolylethyl)-pyridine (Example 20), and 4-(1-benzotriazolylethyl)-pyridine (Example 22); and inducing a state of relaxation, for example, 2-(3-indolylethyl)-pyridine (Example 2), 4-(1-benzyl-3-indolylethyl)-pyridine (Example 7), 2-(1-benzotriazolylethyl)-pyridine (Example 10), 4-(2-methyl-3-indolylethyl)-pyridine (Example 13), 2-(1-benzimidazolylethyl)-pyridine (Example 20), 4-(2-benzotriazolylethyl)-pyridine (Example 21), and 4-(1-benzotriazolylethyl)-pyridine (Example 22), all of which indicates their utility as calming agents or tranquilizers. Some embodiments have been demonstrated by clinical evaluation in humans to be safe and moderately effective depressant agents, for example, 4-(1-methyl-3-indolylethyl)-pyridine (Example 3) and 4-(1-benzyl-3-indolylethyl)-pyridine (Example 7). Other embodiments possess mild analgesic activity, for example, 2-(3-indolylethyl)-pyridine (Example 2), 2-(3-indolylethyl)-5-ethylpyridine (Example 4), 2-(indenylethyl)-pyridine (Example 12), and 2-(1-benzimidazolylethyl)-pyridine (Example 20).

The manner and process of making and using the invention will now be generally described so as to enable any person skilled in the art of chemistry to make and use the same, as follows:

Indene, azaindene and vinylpyridine starting materials, unsubstituted and substituted in a variety of positions, are known. The preferred method for preparing the free base compounds of this invention comprises reacting the desired indene or azaindene nucleus with a vinylpyridine. In conducting the addition reaction, the reagents are caused to react, preferably by heating in the presence of a catalyst. With some compounds, e.g. indoles, an acid catalyst such as acetic acid is preferred for reaction at the 3-position of the indole, while a basic catalyst is usually preferred for reaction at the 1-position of the indole. When the 1- and 3-positions are substituted, an acid catalyst is used for reaction at the 2-position of the indole. With others, e.g. indenes, benzotriazoles, benzimidazoles, et cetera, a basic catalyst is usually preferred. Basic catalysts include: quaternary ammonium hydroxides, such as the Tritons, for example, benzyltrimethylammonium hydroxide; strongly basic amines, such as piperidine or diethylamine; inorganic hydroxides, such as sodium hydroxide, potassium hydroxide or barium hydroxide; alkali metals, such as sodium, lithium or potassium, and similar alkali metal alkoxides, amides or hydrides. The above reaction can be conducted in the presence of a solvent. Where an acid catalyst is used, this may serve as the solvent, e.g. glacial acetic acid; where a basic catalyst is used the solvent can be any of a wide variety of organic solvents, such as aliphatic or aromatic hydrocarbons, alcohols and ethers. Depending upon the reagents, and presence or absence of solvent, the reaction may be conducted at temperatures ranging from room temperature to 200 degrees centigrade, with reflux temperatures being preferred. The reaction solution is concentrated, as by evaporating off the solvent in vacuo, and the product is washed, dried and recrystallized in conventional manner for purifying organic compounds.

The new compounds herein claimed are most conveniently used in the form of their acid addition salts, and these salts are the full equivalents of the subject matter hereinafter claimed. Acids which can be used according to conventional procedures to prepare the acid addition salts of the claimed compounds are preferably those which produce, when combined with a free base, salts whose anions are relatively innocuous to an animal organism in physiologically effective doses of the salts, so that the beneficial physiological properties inherent in the free base are not vitiated by side effects ascribable to the anions.

Appropriate acid addition salts are those derived from mineral acids, such as hydrochloric acid, hydrobromic acid, hydriodic acid, nitric acid, phosphoric acid and sulfuric acid; and organic acids, such as acetic acid, citric acid, tartaric acid, lactic acid, tannic acid, and the like, giving the hydrochloride, hydrobromide, hydriodide, nitrate, phosphate or acid phosphate, sulfate or bisulfate, acetate, citrate or acid citrate, tartrate or bitartrate, lactate, and tannate salts, respectively. The toxic acid addition salts of the compounds of the present invention are also within the purview of the invention since they may be converted, by conventional methods, to non-toxic acid addition salts.

Modes contemplated by the inventors of carrying out their invention will now be set forth, as follows:

EXAMPLES

*Example 1.—4-(3-indolylethyl)-pyridine*

A solution of 26.0 grams (0.25 mole) of 4-vinylpyridine (which may or may not contain a small amount of para-t-butylcatechol as a stabilizer) and 23.4 grams (0.2 mole) of indole in 100 milliliters of glacial acetic acid was refluxed for three hours. The solution was concentrated in vacuo and the residue made weakly basic with dilute alkali. The resultant crystalline precipitate was collected and recrystallized from aqueous isopropyl alcohol to yield 30.6 grams (69 percent of the theoretical yield) of 4-(3-indolylethyl)-pyridine, melting at 149–151 degrees centigrade.

*Analysis.*—Calculated: N (basic), 6.30. Found: N (basic), 6.32.

By the contact interaction of 4-(3-indolylethyl)-pyridine and hydrogen chloride, 4-(3-indolylethyl)-pyridine hydrochloride was prepared which, after recrystallization from ethanol and ether, melted at 260–262 degrees centigrade.

*Analysis.*—Calculated: C, 69.62; H, 5.84; Cl, 13.70. Found: C, 69.78; H, 5.78; Cl, 13.28.

*Example 2.—2-(3-indolylethyl)-pyridine*

A solution of 43 grams (0.41 mole) of freshly distilled 2-vinylpyridine and 35.1 grams (0.3 mole) of indole in 50 milliliters of glacial acetic acid was refluxed for three hours. The solution was concentrated and the residue dissolved in dilute hydrochloric acid. The aqueous acid solution was washed with ether, made weakly basic with dilute alkali and extracted with fresh ether. Drying and removal of the ether left a green-colored, crystalline residue which oiled out of aqueous isopropyl alcohol but solidified on standing. There was obtained 35.4 grams (53 percent of the theoretical yield) of 2-(3-indolylethyl)-pyridine, melting at 118–120 degrees centigrade, after distilling at 170–185 degrees centigrade at a pressure of 0.3 millimeter.

*Analysis.*—Calculated: N (basic), 6.30. Found: N (basic), 6.41.

2-(3-indolylethyl)-pyridine hydrochloride, melting at 157–159 degrees centigrade, after drying in vacuo over phosphorus pentoxide, was prepared by the contacting of 2-(3-indolylethyl)-pyridine and hydrogen chloride.

*Analysis.*—Calculated: C, 69.62; H, 5.84; Cl, 13.70. Found: C, 69.65; H, 6.07; Cl, 13.58.

*Example 3.—4-(1-methyl-3-indolylethyl)-pyridine*

A solution containing 15.9 grams (0.12 mole) of N-methylindole and 15.7 grams (0.15 mole) of 4-vinylpyridine in 100 milliliters of glacial acetic acid was refluxed for 15 hours. The solution was concentrated in vacuo, diluted with 100 milliliters of ten percent hydrochloric acid and washed with ether. The cold aqueous solution was made basic by dropwise addition of dilute alkali, and the resultant precipitate was filtered off and recrystallized from Skellysolve B. Yield of white crystalline product, 4-(1-methyl-3-indolylethyl)-pyridine, amounted to 13.5 grams (45 percent of the theoretical yield), melting at 96–98 degrees centigrade.

*Analysis.*—Calculated: N (basic), 5.93. Found: N (basic), 5.99.

By the contact interaction of 4-(1-methyl-3-indolylethyl)-pyridine and hydrogen chloride, 4-(1-methyl-3-indolylethyl)-pyridine hydrochloride, which melted with decomposition at 152–153 degrees centigrade, was obtained.

*Analysis.*—Calculated: C, 70.45; H, 6.23; Cl, 13.00. Found: C, 70.85; H, 5.87; Cl, 13.19.

*Example 4.—2-(3-indolylethyl)-5-ethylpyridine*

A solution of 23.4 grams (0.2 mole) of indole and 29.5 grams (0.22 mole) of 2-vinyl-5-ethylpyridine and 100 milliliters of glacial acetic acid was refluxed for 3.5 hours. The solution was concentrated in vacuo; made basic with dilute alkali and the resultant oil extracted into ether. The ether extract was shaken well with dilute hydrochloric acid, the acid extract washed with fresh ether and finally made basic with dilute alkali. The oily precipitate was extracted into ether, dried over anhydrous sodium sulfate and concentrated in vacuo. The residue, on cooling, gave a gummy solid which was washed with Skellysolve B. Recrystallization from aqueous isopropanol gave 14.0 grams (28 percent of the theoretical yield) of white crystalline product, 2-(3-indolylethyl)-5-ethylpyridine, melting at 112–113 degrees centigrade.

*Analysis.*—Calculated: N (basic), 5.60. Found: N (basic), 5.61.

By the contact interaction of 2-(3-indolylethyl)-5-ethylpyridine and hydrogen chloride, 2-(3-indolylethyl)-5-ethylpyridine hydrochloride, which melted with decomposition at 164–166 degrees centigrade, was obtained.

*Analysis.*—Calculated: C, 71.19; H, 6.68; Cl, 12.36. Found: C, 70.96; H, 6.54; Cl, 11.94.

*Example 5.—2-(1-methyl-3-indolylethyl)-pyridine*

Following the procedure of Examples 3 and 4 and reacting N-methylindole with 2-vinylpyridine in acetic acid solution, 2-(1-methyl-3-indolylethyl)-pyridine was obtained as a yellow oil, boiling at 170–185 degrees centigrade at a pressure of 0.5 millimeter, having a refractive index $n_D^{25}$ of 1.6140.

*Analysis.*—Calculated: N (basic), 5.93. Found: N (basic), 6.12.

2-(1-methyl-3-indolylethyl)-pyridine hydrochloride, melting at 159–160 degrees centigrade was obtained by the contact interaction of the above free base and hydrogen chloride.

*Analysis.*—Calculated: C, 70.45; H, 6.28; Cl, 13.00. Found: C, 70.70; H, 5.94; Cl, 12.99.

*Example 6.—2-(1-methyl-3-indolylethyl)-5-ethylpyridine*

Following the procedure of Examples 3 and 4 and reacting N-methylindole with 2-vinyl-5-ethylpyridine in acetic acid solution, 2-(1-methyl-3-indolylethyl)-5-ethylpyridine was obtained as a viscous yellow oil, boiling at 175–200 degrees centigrade at a pressure of 0.5 millimeter, having a refractive index $n_D^{24}$ of 1.5957.

*Analysis.*—Calculated: N (basic), 5.30. Found: N (basic), 5.57.

Example 7.—4-(1-benzyl-3-indolylethyl)-pyridine

Following the procedure of Example 6, and reacting N-benzylindole with 4-vinylpyridine in acetic acid solution, 4-(1-benzyl-3-indolylethyl)-pyridine was obtained as a thick yellow oil, boiling at 225–230 degrees centigrade at a pressure of 0.3 millimeter.

*Analysis.*—Calculated: N (basic), 4.48. Found: N (basic), 4.51.

4-(1-benzyl-3-indolylethyl)-pyridine hydrochloride was prepared by the contact interaction of the above free base with hydrogen chloride. It was obtained as a solid which melted at 199–200 degrees centigrade.

*Analysis.*—Calculated: C, 75.74; H, 6.07; Cl, 10.16. Found: C, 75.47; H, 5.96; Cl, 9.95.

The acid sulfate of 4-(1-benzyl-3-indolylethyl)-pyridine, which melted at 180–183 degrees centigrade (with decomposition), was obtained by the contact interaction of the free base with sulfuric acid.

*Analysis.*—Calculated: S, 7.81. Found: S, 7.66.

Example 8.—2-[1-(1-methyl-3-indolyl)-2-propyl]-pyridine

Following the procedure of Example 7 and reacting 1-methylindole with 2-isopropenylpyridine in acetic solution, 2-[1-(1-methyl-3-indolyl)-2-propyl]-pyridine is obtained.

Example 9.—4-(1-indolylethyl)-pyridine

A solution of 52.4 grams (0.5 mole) of 4-vinylpyridine, 29.2 grams (0.25 mole) of indole, 0.5 gram of metallic sodium and 0.5 gram of cupric sulfate in 50 milliliters of ethanol was heated in a sealed tube at 140–150 degrees centigrade (bath temperature) for four hours. The cooled solution was filtered, concentrated in vacuo and the residue taken up in ether and extracted into acid; the acid solution was made alkaline and extracted with ether. Removal of the ether left a red oil which was distilled. Redistillation afforded 31.7 grams (57 percent of the theoretical yield) of the product, 4-(1-indolylethyl)-pyridine, as an oil which crystallized on standing, boiling at 160–165 degrees centigrade at 0.1 millimeter pressure and melting at 41–45 degrees centigrade.

*Analysis.*—Calculated: N (basic), 6.30. Found: N (basic), 6.31.

By contacting 4-(1-indolylethyl)-pyridine with hydrogen chloride, we obtained 4-(1-indolylethyl)-pyridine hydrochloride, which melted with decomposition at 206–208 degrees centigrade.

*Analysis.*—Calculated: C, 69.62; H, 5.34; Cl, 13.70. Found: C, 69.46; H, 5.45; Cl, 13.83.

Example 10.—2-(benzotriazolylethyl)-pyridine

Following the procedure of Example 1, but using 2-vinylpyridine in place of the 4-isomer, we obtained a mixture of 2-(1-benzotriazolylethyl)-pyridine and 2-(2-benzotriazolylethyl)-pyridine as a yellow oil.

2-(benzotriazolylethyl)-pyridine hydrochloride was obtained as a solid melting at 146–153 degrees centigrade (with decomposition) by the contact interaction of the free base with hydrogen chloride. Evidence indicates that the salt was a mixture of 2-(1-benzotriazolylethyl)-pyridine hydrochloride and 2-(2-benzothiazolylethyl)-pyridine hydrochloride.

*Analysis.*—Calculated: C, 59.88; H, 5.03; Cl, 13.60. Found: C, 60.38; H, 5.16; Cl, 13.86.

Example 11.—4-(indenylethyl)-pyridine

A mixture of 35.0 grams (0.3 mole) of freshly distilled indene and three milliliters of an ethanolic solution of sodium ethoxide was heated to 80 degrees centigrade and 47.0 grams (0.45 mole) of 4-vinylpyridine was added dropwise with stirring. Stirring was continued and the mixture was heated for sixteen hours at 80 degrees centigrade. The reaction mixture was extracted with ethylene dichloride and the extract washed with water, dried and distilled. A fraction, boilng at 145–170 degrees centigrade at 0.3 millimeter, which immediately crystallized, was collected and recrystallized from Skellysolve B (with charcoaling) to give 16.3 grams (25 percent of the theoretical yield) of the base, 4-(indenylethyl)-pyridine, melting at 96–97 degrees centigrade.

*Analysis.*—Calculated: N (basic), 6.36. Found: N (basic), 6.52.

4-(indenylethyl)-pyridine hydrochloride, which melted at 223–225 degrees centigrade (with decompositon) was obtained by the contact interaction of the free base with hydrogen chloride.

*Analysis.*—Calculated: C, 74.55; H, 6.26; Cl, 13.76. Found: C, 74.19; H, 6.16; Cl, 13.71.

Example 12.—2-(indenylethyl)-pyridine

To 116 grams (1.0 mole) of indene and 2.0 grams of powdered sodamide in 300 milliliters of dry toluene, stirred and heated to reflux, was added, dropwise, 52.5 grams (0.5 mole) of 2-vinylpyridine in 50 milliliters of dry toluene. Stirring was continued and the reaction mixture was refluxed for five hours. The solution was separated from considerable tarry material and distilled in vacuo. Redistillation yielded 33.0 grams (30 percent of the theoretical yield) of 2-(indenylethyl)-pyridine, boiling at 145–155 degrees centigrade at a pressure of 0.5 millimeter, having a refractive index $n_D^{25}$ of 1.5987.

*Analysis.*—Calculated: N (basic), 6.33. Found: N (basic), 6.39.

The hydrochloride salt of 2-(indenylethyl)-pyridine was prepared by the contact interaction of the free base and hydrogen chloride and melted with decomposition at 147–149.5 degrees centigrade.

*Analysis.*—Calculated: C, 74.55; H, 6.26; Cl, 13.76. Found: C, 74.25; H, 6.19; Cl, 13.58.

Example 13.—4-(2-methyl-3-indolylethyl)-pyridine

By the reaction of 4-vinylpyridine with 2-methylindole following the method of Example 3, 4-(2-methyl-3-indolylethyl)-pyridine, melting at 153–154 degrees centigrade, was obtained.

*Analysis.*—Calculated: N (basic), 5.92. Found: N (basic), 5.77.

The hydrochloride salt of 4-(2-methyl-3-indolylethyl)-pyridine, melting at 242–243 degrees centigrade, was obtained by the contact interaction of the free base and hydrogen chloride.

*Analysis.*—Calculated: C, 70.45; H, 6.20; Cl, 13.00. Found: C, 69.90; H, 6.27; Cl, 12.97.

Example 14.—4-(3-methyl-1-indolylethyl)-pyridine

By reaction of 4-vinylpyridine with skatole following the procedures described in Example 9 (or, less satisfactorily, by following the procedure of Example 3) there was obtained 4-(3-methyl-1-indolylethyl)-pyridine in the form of a thick oil.

The hydrochloride salt of 4-(3-methyl-1-indolylethyl)-pyridine, in the form of a solid melting at 210–212 degrees centigrade, was obtained by the contact interaction of the free base with hydrogen chloride.

*Analysis.*—Calculated: C, 70.45; H, 6.28; Cl, 13.00. Found: C, 70.57; H, 6.18; Cl, 13.04.

Example 15.—4-(1-ethyl-3-indolylethyl)-pyridine

Following the procedure described in Example 3 by the reaction of 4-vinylpyridine with 1-ethylindole, there was obtained 4-(1-ethyl-3-indolylethyl)-pyridine, which melted at 47–50 degrees centigrade.

*Analysis.*—Calculated: N (basic), 5.59. Found: N (basic), 5.66.

The hydrochloride salt of 4-(1-ethyl-3-indolylethyl)-pyridine, which melted at 167–169 degrees centigrade, was obtained by the contact interaction of the free base with hydrogen chloride.

*Analysis.*—Calculated: C, 71.18; H, 6.67; Cl, 12.36. Found: C, 71.26; H, 6.36; Cl, 11.99.

*Example 16.—4-(1-benzimdazolylethyl)-pyridine*

To 23.6 grams (0.23 mole) of freshly distilled 4-vinylpyridine and 23.6 grams (0.2 mole) of benzimidazole dissolved in 200 milliliter of isopropyl alcohol was added 5 milliliters of Triton A–20. After 20 hours reflux, the solution was taken to dryness in vacuo and the residue dissolved in a mixture of ethanol and ether. The white precipitate that formed when hydrogen chloride gas was bubbled into the solution was recrystallized twice from alcohol and ether to yield 19.7 grams of 4-(1-benzimidazolylethyl)-pyridine dihydrochloride, melting at 208–211 degrees centigrade.

*Analysis.*—Calculated: C, 56.76; H, 5.10; Cl, 23.94. Found: C, 56.84; H, 5.05; Cl, 23.56.

An aqueous solution of the dihydrochloride was made weakly basic with dilute alkali and exhaustively extracted with chloroform. Drying and removal of the chloroform a green oil which solidified on standing. The 4-(1-benzimidazolylethyl)-pyridine base thus obtained melted at 97–98 degrees centigrade.

*Analysis.*—Calculated: N (basic), 12.56. Found: N (basic), 12.25.

*Example 17.—3-(5-methoxy-1-indolylethyl)-pyridine*

To a toluene solution of 5-methoxyindole, stirred and heated on a steam-bath, is added one equivalent of sodamide and then, dropwise, a toluene solution of one equivalent of 3-(chloroethyl)-pyridine. The reaction mixture is heated on the steam bath for 8 hours and worked up to give 3-(5-methoxy-1-indolylethyl)-pyridine as a low melting solid.

3-(5-methoxy-1-indolylethyl)-pyridine hydrochloride is obtained by treatment of an ether solution of the base with excess ethereal hydrogen chloride.

*Example 18.—4-(1,3-dimethyl-2-indolylethyl)-pyridine*

A solution of one equivalent of 1,3-dimethylindole, 1.2 equivalents of 4-vinylpyridine and 1 equivalent of acetic anhydride in glacial acetic acid is refluxed in an oil-bath for 30 hours. The reaction mixture is worked up to yield 4-(1,3-dimethyl-2-indolylethyl)-pyridine as a low melting solid.

*Example 19.—2-(6-chloro-2-indolylethyl)-pyridine*

To a liquid ammonia solution of one equivalent of 2-picolyl lithium is added, in portions, one equivalent of the methiodide of 6-chloro-2-indolylmethyldimethylamine [prepared essentially by the method described by H. R. Snyder and P. L. Cook, J. Am. Chem. Soc., 78, 969 (1956)], for the 6-methyl analog. The reaction mixture is stirred and the liquid ammonia gradually replaced by the dimethyl ether of ethylene glycol. After the ammonia has evaporated, the ether solution is refluxed on a steam-bath for 8 hours and worked up to yield 2-(6-chloro-2-indolylethyl)-pyridine as a solid product.

*Example 20.—2-(1-benzimidazolylethyl)-pyridine*

As described in Example 16, benzimidazole was reacted with 2-vinylpyridine to provide 2-(1-benzimidazolylethyl)-pyridine which was isolated as the dihydrochloride salt, melting at 206–207 degrees centigrade.

*Analysis.*—Calculated: C, 56.76; H, 5.10; Cl, 23.94. Found: C, 56.85; H, 5.12; Cl, 23.30.

*Example 21.—4-(2-benzotriazolylethyl)pyridine*

To a refluxing solution of 40.0 grams (0.33 mole) of benzotriazole and 10 drops of benzyltrimethylammonium methoxide (40% methanol solution) in 100 milliliters of isopropyl alcohol was added 31.5 grams (0.30 mole) of 4-vinylpyridine over a period of 45 minutes. Refluxing was continued for thirty hours. The reaction solution was diluted with about 700 milliliters of water to precipitate a thick oil which was dissolved in ether. The ether solution was extracted with 5% hydrochloric acid, and the acid extract was made basic with 20% sodium hydroxide. The alkaline mixture was extracted with ether. The ether extract was dried over sodium sulfate and concentrated. The residue was extracted with hot Skellysolve B. Upon cooling, the Skellysolve B extract deposited colorless crystals which gave, after two recrystallizations from Skellysolve B, 17.0 grams of white flakes melting at 92–96 degrees centigrade. Physical properties and ultra-violet spectrum indicate that the product is 4-(2-benzotriazolylethyl)-pyridine.

*Analysis.*—Calculated: N (basic) 6.25. Found: N (base), 6.68.

By the contact interaction of 4-(2-benzotriazolylethyl)-pyridine and hydrogen chloride, 4-(2-benzotriazolylethyl)-pyridine hydrochloride was obtained. The hydrochloride salt crystallized from isopropyl alcohol as white needles which melted at 197–200 degrees centigrade.

*Analysis.*—Calculated: C, 59.88; H, 5.03; Cl, 13.60. Found: C, 60.13; H, 4.74; Cl, 13.56.

*Example 22.—4-(1-benzotriazolylethyl)-pyridine*

The Skellysolve B insoluble residue obtained in Example 21 was dissolved in benzene and precipitated with Skellysolve B to give 11.0 grams of white crystals which melted at 101–103 degrees. Physical properties and ultra-violet spectrum indicate that the product is 4-(1-benzotriazolylethyl)-pyridine. A mixture melting point of the bases of Examples 21 and 22 was 85–93 degrees centigrade.

*Analysis.*—Calculated: N (basic), 6.25. Found: N (basic), 6.15.

By the contact interaction of 4-(1-benzotriazolylethyl)-pyridine and hydrogen chloride, 4-(1-benzotriazolylethyl)-pyridine hydrochloride was obtained. The hydrochloride salt crystallized from isopropyl alcohol as white needles, which melted at 200–202 degrees centigrade. A mixture melting point of the hydrochloride salts of Examples 21 and 22 was depressed to 190–197 degrees centigrade.

*Analysis.*—Calculated: C, 59.86; H, 5.03; Cl, 13.60. Found: C, 59.91; H, 5.01; Cl, 13.50.

Other indenylethylpyridines and azaindenylethylpyridines can be prepared in the manner above described by substituting the desired vinylpyridine for any vinylpyridine in any of the examples specifically illustrating the modes of carrying out the invention.

This application is a continuation-in-part of our prior copending application, S.N. 593,058, filed June 22, 1956, now abandoned for "Organic Compounds." Many of the compounds of the present application are described in the parent application as intermediates used to make the unsymmetric bis-quaternary ammonium salts claimed therein, which are useful for their hypotensive activity, e.g. 4-(3-indolylethyl)-pyridine is reacted with 3-bromopropyltrimethylammonium bromide to yield 1-4-(3-indolylethyl)-pyridinium-3-(trimethylammonium)-propane dibromide.

It is to be understood that the invention is not to be limited to the exact compounds shown and described, as obvious modifications and equivalents will be apparent to one skilled in the art of chemistry, and the invention is, therefore, to be limited only by the scope of the appended claims and equivalents thereof.

We claim:
1. 4-(3-indolylethyl)-pyridine.
2. 4-(1-methyl-3-indolylethyl)-pyridine.
3. 4-(1-benzyl-3-indolylethyl)-pyridine.
4. 4-(1-ethyl-3-indolylethyl)-pyridine.
5. 4-(1-indolylethyl)-pyridine.

References Cited by the Examiner

UNITED STATES PATENTS 2,498,497   2/1950   Kirchner et al. _____ 260—295

OTHER REFERENCES

Castle et al.: "J. Org. Chem.," vol. 24, pp. 1189–92 (1959).
Clemo et al.: J. Chem. Soc. (1954), pp. 2582–4.
Deubel et al.: "Ang. Chem.," vol. 71, p. 310 (1959).
Moreno: Chemical Abstracts, vol. 49, p. 15070 (1955).
Morton: "The Chemistry of Heterocyclic Compounds" (McGraw-Hill) (1946), p. 104.
Noller: "Chemistry of Organic Compounds," 2nd edition, pp. 54–6, 241 (Saunders) (1957).
Phillips: J.A.C.S., vol. 78, pp. 4441–3 (1956).
Profft: J. Pract. Chem., 4 Reihe, Band 4, pp. 19–34 (1956).
Reich et al.: J.A.C.S., vol. 77, pp. 4913–15 (1955).

WALTER A. MODANCE, *Primary Examiner.*

N. S. RIZZO, I. MARCUS, *Examiners.*

F. KEIRE, R. T. BOND, *Assistant Examiners.*